(12) United States Patent
Boyer et al.

(10) Patent No.: US 9,973,524 B2
(45) Date of Patent: May 15, 2018

(54) INFORMATION TECHNOLOGY SECURITY ASSESSMENT SYSTEM

(71) Applicant: BitSight Technologies, Inc., Cambridge, MA (US)

(72) Inventors: Stephen Boyer, Cambridge, MA (US); Nagarjuna Venna, Waltham, MA (US); Megumi Ando, Cambridge, MA (US)

(73) Assignee: BitSight Technologies, Inc., Cambridge, MA (US)

( * ) Notice: Subject to any disclaimer, the term of this patent is extended or adjusted under 35 U.S.C. 154(b) by 0 days. days.

(21) Appl. No.: 14/944,484

(22) Filed: Nov. 18, 2015

(65) Prior Publication Data

US 2016/0323308 A1 Nov. 3, 2016

Related U.S. Application Data

(63) Continuation of application No. 13/240,572, filed on Sep. 22, 2011.

(60) Provisional application No. 61/492,287, filed on Jun. 1, 2011, provisional application No. 61/386,156, filed on Sep. 24, 2010.

(51) Int. Cl.
*H04L 29/06* (2006.01)
*G06Q 10/06* (2012.01)
*H04L 12/26* (2006.01)
*H04L 29/12* (2006.01)
*H04L 29/08* (2006.01)

(52) U.S. Cl.
CPC ..... *H04L 63/1433* (2013.01); *G06Q 10/0639* (2013.01); *H04L 43/062* (2013.01); *H04L 43/0876* (2013.01); *H04L 61/2007* (2013.01); *H04L 67/20* (2013.01)

(58) Field of Classification Search
CPC .................................. H04L 63/1433
See application file for complete search history.

(56) References Cited

U.S. PATENT DOCUMENTS

| | | | | |
|---|---|---|---|---|
| 5,867,799 A | * | 2/1999 | Lang | G06F 17/30702 |
| 6,016,475 A | * | 1/2000 | Miller | G06F 17/30867 |
| | | | | 705/26.7 |
| 6,792,401 B1 | | 9/2004 | Nigro et al. | |

(Continued)

OTHER PUBLICATIONS

Transaction history of U.S. Appl. No. 14/021,585 and pending claims as of Mar. 22, 2016.

(Continued)

*Primary Examiner* — Oleg Korsak
*Assistant Examiner* — Simon Kanaan
(74) *Attorney, Agent, or Firm* — Goodwin Procter LLP

(57) ABSTRACT

A method and system for creating a composite security rating from security characterization data of a third party computer system. The security characterization data is derived from externally observable characteristics of the third party computer system. Advantageously, the composite security score has a relatively high likelihood of corresponding to an internal audit score despite use of externally observable security characteristics. Also, the method and system may include use of multiple security characterizations all solely derived from externally observable characteristics of the third party computer system.

20 Claims, 3 Drawing Sheets

(56) References Cited

U.S. PATENT DOCUMENTS

| | | | |
|---|---|---|---|
| 7,100,195 B1* | 8/2006 | Underwood | G06F 9/4443 |
| | | | 707/999.009 |
| 7,194,769 B2 | 3/2007 | Lippmann et al. | |
| 7,290,275 B2 | 10/2007 | Baudoin et al. | |
| 7,747,778 B1* | 6/2010 | King | H04L 12/24 |
| | | | 709/220 |
| 7,748,038 B2* | 6/2010 | Olivier | H04L 63/145 |
| | | | 713/188 |
| 7,971,252 B2 | 6/2011 | Lippmann et al. | |
| 8,429,630 B2 | 4/2013 | Nickolov et al. | |
| 8,504,556 B1 | 8/2013 | Rice et al. | |
| 2001/0044798 A1 | 11/2001 | Nagral et al. | |
| 2002/0083077 A1 | 6/2002 | Vardi | |
| 2003/0050862 A1 | 3/2003 | Bleicken et al. | |
| 2003/0123424 A1 | 7/2003 | Jung | |
| 2004/0010709 A1 | 1/2004 | Baudoin et al. | |
| 2004/0024859 A1 | 2/2004 | Bloch et al. | |
| 2004/0133561 A1 | 7/2004 | Burke | |
| 2004/0193918 A1 | 9/2004 | Green et al. | |
| 2004/0199791 A1 | 10/2004 | Poletto et al. | |
| 2004/0199792 A1 | 10/2004 | Tan et al. | |
| 2004/0221296 A1* | 11/2004 | Ogielski | H04L 12/24 |
| | | | 719/313 |
| 2004/0250122 A1 | 12/2004 | Newton | |
| 2004/0250134 A1 | 12/2004 | Kohler et al. | |
| 2005/0071450 A1 | 3/2005 | Allen et al. | |
| 2005/0080720 A1* | 4/2005 | Betz | G06Q 40/08 |
| | | | 705/38 |
| 2005/0108415 A1 | 5/2005 | Turk et al. | |
| 2005/0131830 A1 | 6/2005 | Juarez et al. | |
| 2005/0138413 A1 | 6/2005 | Lippmann et al. | |
| 2005/0278726 A1* | 12/2005 | Cano | H04L 67/1095 |
| | | | 719/315 |
| 2006/0173992 A1 | 8/2006 | Weber et al. | |
| 2006/0212925 A1 | 9/2006 | Shull et al. | |
| 2007/0143851 A1 | 6/2007 | Nicodemus et al. | |
| 2007/0282730 A1* | 12/2007 | Carpenter | G06Q 40/06 |
| | | | 705/36 R |
| 2008/0047018 A1 | 2/2008 | Baudoin et al. | |
| 2008/0140495 A1 | 6/2008 | Bhamidipaty et al. | |
| 2008/0162931 A1 | 7/2008 | Lord et al. | |
| 2008/0209565 A2 | 8/2008 | Baudoin et al. | |
| 2009/0044272 A1 | 2/2009 | Jarrett | |
| 2009/0161629 A1* | 6/2009 | Purkayastha | H04W 36/0011 |
| | | | 370/331 |
| 2009/0193054 A1 | 7/2009 | Karimisetty et al. | |
| 2009/0265787 A9 | 10/2009 | Baudoin et al. | |
| 2009/0293128 A1 | 11/2009 | Lippmann et al. | |
| 2010/0262444 A1 | 10/2010 | Atwal et al. | |
| 2011/0185403 A1 | 7/2011 | Dolan et al. | |
| 2012/0158725 A1 | 6/2012 | Molloy et al. | |
| 2012/0166458 A1* | 6/2012 | Laudanski | H04L 51/12 |
| | | | 707/755 |
| 2012/0215892 A1* | 8/2012 | Wanser | H04L 61/1552 |
| | | | 709/222 |
| 2014/0108474 A1 | 4/2014 | David et al. | |
| 2014/0204803 A1 | 7/2014 | Nguyen | |
| 2015/0074579 A1 | 3/2015 | Gladstone et al. | |
| 2015/0310188 A1 | 10/2015 | Ford et al. | |

OTHER PUBLICATIONS

Transaction history of U.S. Appl. No. 13/240,572, application as filed and pending claims as of Mar. 22, 2016.

Edmonds, Robert, "ISC Passive DNS Architecture", Internet Systems Consortium, Inc., Mar. 2012 (18 pages).

SBIR Phase I: Enterprise Cyber Security Scoring, CyberAnalytix, LLC, http://www.nsf.gov/awardsearch/showAward.do?AwardNumber=1013603, Apr. 28, 2010.

"Twenty Critical Controls for Effective Cyber Defense: Consensus Audit," Version 2.3, Nov. 13, 2009, retrieved on Apr. 9, 2010 from http://www.sans.org/critical-security-controls/print.php.

"An Executive View of IT Governance," IT Governance Institute, 2009, 32 pages.

Lippmann, R.P., et al., "An Annotated Review of Papers on Attack Graphs," Project Report IA-1, Lincoln Laboratory, Massachusetts Institute of Technology, Mar. 31, 2005, 39 pages.

Artz, Michael Lyle, "NetSPA: A Network Security Planning Architecture," Massachusetts Institute of Technology, May 24, 2002, 97 pages.

Nye, John, "Avoiding Audit Overlap," Moody's Risk Services, Presentation, Source Boston, Mar. 14, 2008, 19 pages.

"Agreed Upon Procedures," Version 4.0, BITS, The Financial Institution Shared Assessments Program, Assessment Guide, Sep. 2008, 56 pages.

"Master Security Criteria," Version 3.0, BITS Financial Services Security Laboratory, Oct. 2001, 47 pages.

The Financial Institution Shared Assessments Program, Industry Positioning and Mapping Document, BITS, Oct. 2007, 44 pages.

Browne, Niall, et al., "Shared Assessments Program AUP and SAS70 Frequently Asked Questions," BITS, 4 pages.

"Shared Assessments: Getting Started," BITS, 2008, 4 pages.

Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.

Buckshaw, Donald L., "Use of Decision Support Techniques for Information System Risk Management," submitted for publication in Wiley's Encyclopedia of Quantitative Risk Assessment in Jan. 2007, 11 pages.

Buehler, Kevin S., et al., "Running with risk," The McKinsey Quarterly, No. 4, 2003, pp. 40-49.

Chu, Matthew, et al., "Visualizing Attack Graphs, Reachability, and Trust Relationships with Navigator," MIT Lincoln Library, VizSEC '10, Ontario, Canada, Sep. 14, 2010, 12 pages.

The CIS Security Metrics v1.0.0, The Center for Internet Security, May 11, 2009, 90 pages.

Method Documentation, CNSS Risk Assessment Tool Version 1.1, Mar. 31, 2009, 24 pages.

Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.

"Assuring a Trusted and Resilient Information and Communications Infrastructure," Cyberspace Policy Review, May 2009, 76 pages.

Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.

Dillon-Merrill, PhD., Robin L, et al., "Logic Trees: Fault, Success, Attack, Event, Probability, and Decision Trees," Wiley Handbook of Science and Technology for Homeland Security, 13 pages.

Dun & Bradstreet, The DUNSRight Quality Process: Power Behind Quality Information, 24 pages.

The Dun & Bradstreet Corp. Stock Report, Standard & Poor's, Jun. 6, 2009, 8 pages.

Equifax Inc. Stock Report, Standard & Poor's, Jun. 6, 2009, 8 pages.

The Fair Credit Reporting Act (FCRA) of the Federal Trade Commission (FTC), Jul. 30, 2004, 86 pages.

Report to the Congress on Credit Scoring and Its Effects on the Availability and Affordability of Credit, Board of Governors of the Federal Reserve System, Aug. 2007, 304 pages.

Stone-Gross, Brett, et al., "FIRE: Finding Rogue Networks," 10 pages.

Ingols, Kyle, et al., "Modeling Modern Network Attacks and Countermeasures Using Attack Graphs," MIT Lincoln Laboratory, 16 pages.

Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.

Ingols, Kyle, et al., "Practical Experiences Using SCAP to Aggregate CND Data," MIT Lincoln Library, Presentation to NIST SCAP Conference, Sep. 24, 2008, 59 pages.

Johnson, Eric, et al., "Information Risk and the Evolution of the Security Rating Industry," Mar. 24, 2009, 27 pages.

(56) References Cited

OTHER PUBLICATIONS

Lippmann, R.P., et al., "Evaluating and Strengthening Enterprise Network Security Using Attack Graphs," Project Report IA-2, MIT Lincoln Laboratory, Oct. 5, 2005, 96 pages.
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
Lippmann, Richard, et al., "Validating and Restoring Defense in Depth Using Attack Graphs," MIT Lincoln Laboratory, 10 pages.
"Plugging the Right Holes," Lab Notes, MIT Lincoln Library, Posted Jul. 2008, retrieved Sep. 14, 2010 from http://www.11.miLedufpublicationsflabnotesfpluggingtherightho!. . . , 2 pages.
Rare Events, Oct. 2009, JASON, The MITRE Corporation, Oct. 2009, 104 pages.
Lippmann, Rich, et al., NetSPA: a Network Security Planning Architecture, MIT Lincoln Laboratory, 11 pages.
Proposal and Award Policies and Procedures Guide, Part I—Proposal Preparation & Submission Guidelines GPG, The National Science Foundation, Feb. 2009, 68 pages.
Paxson, Vern, "How the Pursuit of Truth Led Me to Selling Viagra," EECS Department, University of California, International Computer Science Institute, Lawrence Berkeley National Laboratory, Aug. 13, 2009, 68 pages.
"Report on Controls Placed in Operation and Test of Operating Effectiveness," EasCorp, Jan. 1 through Dec. 31, 2008, prepared by Crowe Horwath, 58 pages.
Taleb, Nassim N., et al., "The Six Mistakes Executives Make in Risk Management," Harvard Business Review, Oct. 2009, 5 pages.
2009 Data Breach Investigations Report, study conducted by Verizon Business RISK Team, 52 pages.
Williams, Leevar, et al., "GARNET: A Graphical Attack Graph and Reachability Network Evaluation Tool," MIT Lincoln Library, VizSEC 2009, pp. 44-59.
Williams, Leevar, et al., "An Interactive Attack Graph Cascade and Reachability Display," MIT Lincoln Laboratory, 17 pages.
Transaction history of U.S. Appl. No. 61/386,156 as of Oct. 7, 2015.
Transaction history and pending claims of U.S. Appl. No. 14/021,585 as of Nov. 18, 2015.
Application as filed, Transaction history and pending claims of U.S. Appl. No. 13/240,572 as of Nov. 18, 2015.
Computer Network Graph—Bees, http://bioteams.com/2007/04/30/visualizing_complex_networks.html, date accessed Sep. 28, 2016.
Computer Network Graph—Univ. of Michigan, http://people.cst.cmich.edu/liao1q/research.shtml, date accessed Sep. 28, 2016.
Hacking Exposed 6, S. McClure et al., copyright 2009, 37 pages.
MaxMind, https://www.maxmind.com/en/about-maxmind, https://www.maxmind.com/en/geoip2-isp-database, date accessed Sep. 28, 20116, 3 pages.
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Network Security Assessment, C. McNab, copyright 2004, 13 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
RFC 1834, https://tools.ietf.org/html/rfc1834, date accessed Sep. 28, 2016, 7 pages.
SamSpade Network Inquiry Utility, https://www.sans.org/reading-room/whitepapers/tools/sam-spade-934, date accessed Sep. 28, 2016, 19 pages.
Security Warrior, Cyrus Peikari, Anton, Chapter 8: Reconnaissance, 6 pages.
Snort Intrusion Monitoring System, http://archive.oreilly.com/pub/h/1393, date accessed Sep. 28, 2016, 3 pages.
Wikipedia, https://en.wikipedia.org/wiki/Crowdsourcing, date accessed Sep. 28, 2016.

* cited by examiner

INFORMATION TECHNOLOGY SECURITY ASSESSMENT SYSTEM

CROSS-REFERENCE TO RELATED APPLICATIONS

This application is a continuation application and claims priority under 35 U.S.C. § 120 to U.S. application Ser. No. 13/240,572, filed Sep. 22, 2011, entitled "Information Technology Security Assessment System", which claims priority to U.S. Prov. Pat. App. No. 61/386,156 entitled "Enterprise Information Security Score" and filed on Sep. 24, 2010; and 61/492,287 entitled "Information Technology Security Assessment System" and filed on Jun. 1, 2011 which are hereby incorporated herein in their entirety by reference.

ACKNOWLEDGEMENT

This invention was made with government support under 1127185 awarded by the National Science Foundation. The government has certain rights to this invention.

BACKGROUND

The present invention relates to systems for determining the security of information systems and, in particular, for evaluating the security of third-party computer systems.

When a company wants to reduce its cyber security risk of doing business with another company's computer systems, it either performs, or hires an outside firm to perform, a cyber security assessment of the other company to determine if it is following good security practices. The theory is that these good practices make it difficult for attackers to compromise the networks of the other company. If the auditing company is satisfied with the assessment, it may choose to continue doing business with the other company. Or, it may ask the other company to make some improvements to its security systems or terminate the business relationship.

Generally, these audits are slow, expensive and impractical given the high volume of service provider security systems that need to be characterized by the company. And, the inventors have noted that audits are not entirely predictive of the performance of the security systems.

SUMMARY

A method and system is disclosed for creating a composite security rating from security characterization data of a third party computer system. The security characterization data is derived from externally observable characteristics of the third party computer system. Advantageously, the composite security rating has a relatively high likelihood of corresponding to an internal audit score despite use of externally observable security characteristics. Also, the method and system may include use of multiple security characterizations all solely derived from externally observable characteristics of the third party computer system.

A method of evaluating information security of a third party computer system is disclosed. The method includes collecting at least two security characterizations of the third party computer system. A composite security rating is generated using the at least two security characterizations. Advantageously, the two security characterizations are derived from externally observable characteristics of the third party system.

Each of the security characterizations may be from an associated one of a plurality of independent entities. For example, the independent entities may include commercial data sources. Also, the security characterizations may be derived without permission of the third party system.

The security characterizations may include multiple data types, such as breach disclosures, block lists, configuration parameters, malware servers, reputation metrics, suspicious activity, spyware, white lists, compromised hosts, malicious activity, spam activity, vulnerable hosts, phishing, user-behavior or e-mail viruses. The externally observable characteristics may also include serving of malicious code or communications with known attacker controlled networks.

The externally observable characteristics may be evidence of internal security controls or outcomes or operational execution of security measures of the third party computer system.

The collecting and generating steps may be repeated to generate a series of scores and the series examined to determine a trend. Also, the scores may be reported to a consumer. For instance, reporting may include reporting a warning based on a change in the scores. Or, reporting may include posting the score and warning to a web portal.

Collecting the security characterizations may include using various tools such as WGET, RSYNC, CURL or interfaces that may be characterization specific.

The method may also include mapping the third party computer system to an IP space and using the IP space for collecting the security characterizations. Mapping, for example, may include querying a Regional Internet Registry (RIR), such as by submitting an entity name to the RIR. Querying an entity name may include querying for variations of the entity name.

Mapping may also include using a domain name associated with the third party computer system. For example, tools such as nslookup or dig may be used on the domain name to determine a published IP address. Mapping may also include probing addresses around the published IP address. For example, IP addresses could be probed in powers of two around the published IP address. Mapping could also include adapting the domain name to server naming conventions and using tools like nslookup to verify an IP address associated with the domain name.

Generating the composite security rating may include assessing vulnerability and resilience of the third party computer systems. Vulnerability, for example, may include a number of IP addresses with malicious behavior. Resilience may be inversely proportional to a duration of malicious behavior.

The IP space may include a plurality of IP addresses. And, the composite security rating may correspond to an intensity and duration of malicious activity determined from one of the security characterizations. Generation of the composite security rating may include aggregation of a plurality of individual security metrics and/or the IP addresses associated with the third party computer system.

Determination of the individual security metric may include adjusting for false positives in the security characterizations. Correlating data across multiple related security characterizations may help improve the quality of any single security characterization. Further, adjusting for false positives may include determining an occurrence of an event, which includes persistent, reported activity on one of the IP addresses for a predetermined period of time. It may also include determining an intensity of the IP address for the predetermined period of time, such as a day.

Determining the intensity may include increasing intensity in proportion to a number of reporting targets from the security characterizations.

Determining an individual security metric may include assigning a raw score for each of the IP addresses appearing on a block list as one of the security characterizations. After an IP address is delisted, the raw score may be exponentially attenuated.

The individual security metric may also incorporate a raw score in proportion to a CIDR block size.

Individual security metrics or the composite ratings may be normalized based on, for example, network size or a number of employees.

Security characterizations may also include positive information about an organization that's aggregated into the composite rating.

The method could also include statistically correlating the composite security rating with actual outcomes and adjusting the generating step based on the statistical correlations.

Further, the method may include determining a confidence range of the composite security rating. For example, the confidence range may be based on a redundancy of the security characterizations or a size of the third party computer system.

The method may also include determining an accuracy of each of the security characterizations, such as by determining a level of coverage of the third party computer system by the security characterizations.

Also disclosed herein are a system and computer program product for data collection and scoring, including systems and software for performing the methods described above.

Another method may include generating a composite security rating using at least one security characterization that's derived from externally observable characteristics of the third party computer system wherein the composite security rating has a relatively high likelihood of corresponding to an internal audit score.

DETAILED DESCRIPTION

Figure 1:
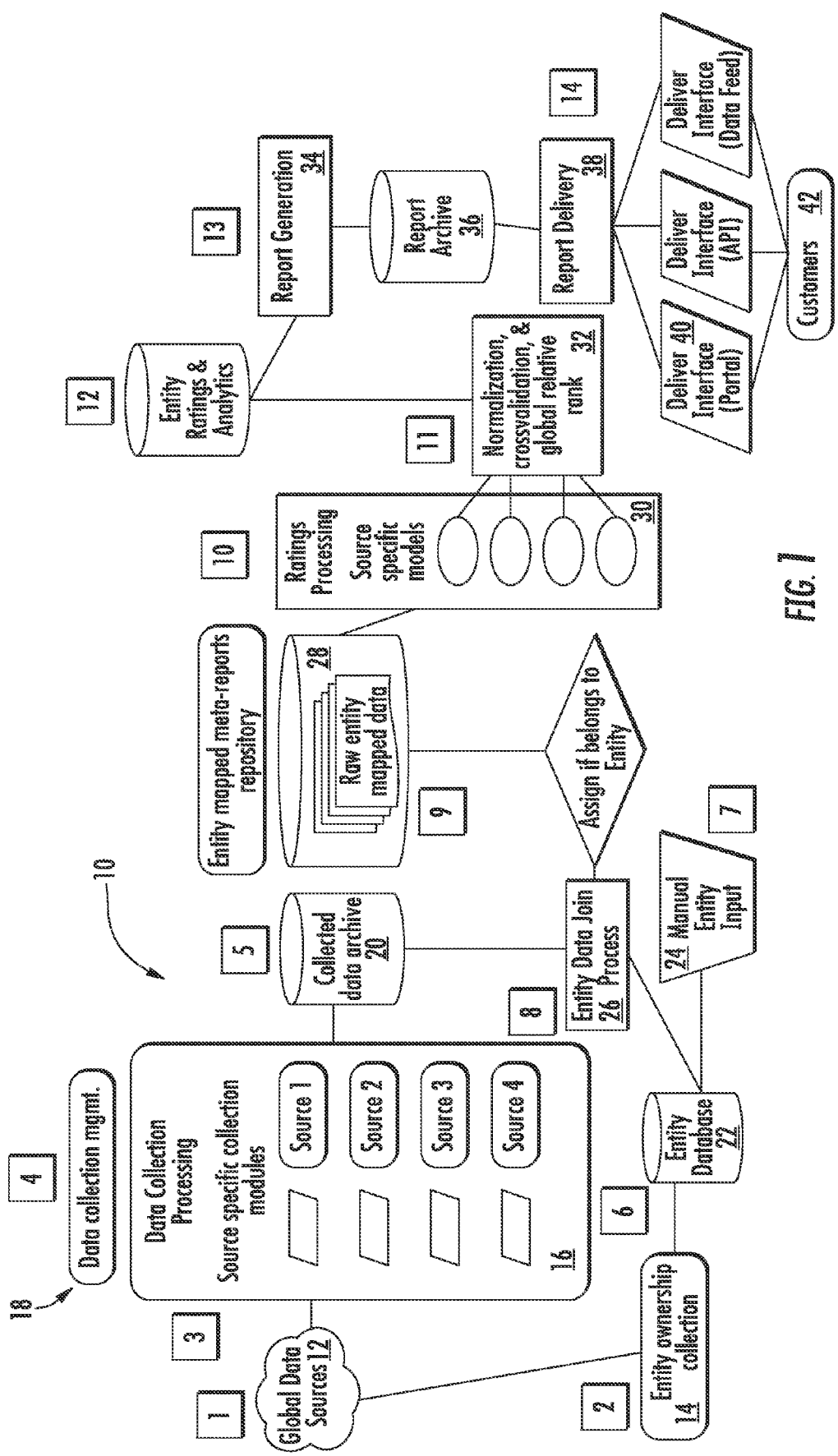
FIG. 1 is a schematic of a system for evaluating information security.

Generally, the present invention includes a method, system and computer program product for creating composite security ratings from security characterization data of a third party computer system. The security characterization data is derived from externally observable characteristics of the third party computer system. Advantageously, the composite security rating has a relatively high likelihood of corresponding to an internal audit score despite use of externally observable security characteristics. Also, the method and system may include use of multiple security characterizations all solely derived from externally observable characteristics of the third party computer system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIG. 1, a system 10 for evaluating information security of a third party computer system includes the following systems: a global data source 12, an entity ownership collector 14, a data collection processor 16, a data collection management 18, a data archive 20, an entity database 22, a manual entity input 24, an entity data join process 26, an entity mapped meta-reports repository 28, a ratings processing 30, a normalization, consolidation and global relative rank 32, a report generation 34, a report archive 36 and a report delivery 38 systems. Different delivery modules 40 are configured to use different methods to deliver the reports to customers 42.

The global data source system 12 obtains data sources that characterize any observation about an entity (e.g., a third party computer system) and these sources can be highly varied and disparate. Each data source has a particular vantage point of the security related characteristics of entities.

The entity ownership collection system 14 gathers information about an entity. This includes information about which IT assets an entity owns, controls, uses, or is affiliated with. Examples of asset ownership include control and operation of an Internet Protocol (IP) network address range or computer services such as web servers residing within that address block. Information about entities also includes relationships such as subsidiaries, affiliates, etc., that describe entity association.

The data collection processing system 16 includes custom modules configured to collect and process unique data sources.

The data collection management system 18 is configured to schedule and coordinate the constant collection of the different data sources.

The data archive 20 is configured to store all of the terabytes of data constantly collected by the data collection management system 18.

The entity database 22 holds all of the information about an entity such as its name, address, web site address, industry sector, IP address ranges owned, etc. This data base includes the "Entity Map" which maps data back to an entity. For example, if observations are made about a particular IP address, the IP address can be looked up in the entity map to determine which entity controls or owns that address. This database is populated by automatic or manual data collection methods, or combinations thereof.

The manual entity input system is configured to place non-automatic data on an entity into the entity database 22.

The entity data join process or system 26 is configured to match the collected data to the entity. In most instances, this is a computationally expensive operation because it requires going though all of the data collected and performing the map operation. Any evidence of security outcomes or configurations in the larger data collection pool is then assigned to an entity based on the entity map.

The entity mapped meta-reports repository 28 contains data summaries of observations made with respect to a particular entity for each data set after the map/join process is complete.

The ratings processing system 30 may include custom models for applying data source specific ratings to determine an entity rating. Each data source generally requires a custom model due to the unique nature of that data source. Each model accounts for the custom attributes and idiosyncrasies of the different data sources that have been mapped to the entity being rated. Custom data source models can account for any data source feature including temporal and cross-data source behaviors.

The ratings normalization, cross-validation, and relative ranking system 32 is configured to normalize ratings so appropriate entity-to-entity comparisons can be made and the ratings are normalized and ranked within sectors or peer-groups and globally.

An entity and rating analytics repository or archive 36 is configured to hold all of the ratings data and resulting analytics produced by the ratings process.

A report generation system 34 takes the ratings and analytics and generates report objects. These objects are not rendered into any particular presentation format at this stage but are in a generic intermediary format that can be then transformed into a specific deliverable format.

A report delivery system 38 is configured to translate generic reports into a specific report format. Examples of these formats include HTML, PDF, text, and XML. Delivery modules 40 are different methods for delivering the reports include by web portal, API or data feed.

Advantages include ratings based on the quality of outcomes of the information security practices of the third party computer systems and enablement of comparisons of ratings across organizations. The system 10 can be entirely, or to a large extent, automated and need not have the permission of the entity being rated. The reports will allow risk management professionals to monitor, assess and mitigate partner risk by up-to-date ratings due to its persistent monitoring of the third party computer systems. Also, the portal may provide for location of new partners, such as suppliers, with lower risk profiles and improved security postures.

Unlike internal audit systems, the system 10 is not relying upon a correlation between practices and outcomes. Instead, evidence of actual security outcomes is collected through the data source partners.

Also advantageously, trial data on 50 entities revealed that rankings produced using the system 10 matched internal evaluations. In some cases the system 10 revealed problems with the entities not revealed by internal evaluations.

Data Sources

External ratings from data sources available outside an entity provide an information security based view into internal workings of the organization. For example, infection by malicious software can be determined using non-invasive website scanning technology. Communication between the entity computer system and known attacker controlled networks may reveal when the computer system has been compromised. Also, if an entity computer system is serving malicious code to visitors the system was compromised at some point. The entity may not have the capability to detect such compromises or cannot quickly react operationally to resolve the issue. External observations also can measure operational execution, which may not occur despite good internal policies.

A diverse set of network sensors and services around the Internet collect and observe information about the third party entity computer systems. The system 10 then gathers, processes, and stores the data collected about entities from the sensors and service providers using custom developed data source specific collection processors. The collection manager 18 automates the scheduling and execution of the different collectors.

The global data source system 12 includes hundreds of potential data sources, including, for example during experimental testing, 97 data sources owned by 37 organizations. At least 82 data sources are on active collection, being stored on the data archive 20. Trial ratings were performed on at least 11 data sources from 7 organizations. Rankings were produced on nearly 600 different entities.

A data source is a single type of data from a single organization. For example, if two organizations provide a list of hosts that participate in phishing attacks, they are counted as two data sources. The 15 types of data in Table 3 all provide different information security related views of an organization. New types of data and new sources of existing data types are constantly added to the data sources used to characterize the performance of the entity. Breach disclosures for example indicate that an organization has experienced a particular kind of data or integrity breach. Configuration data on the other hand provides any number of configuration related information and could for example state the type of encryption used on the organization's website.

TABLE 1

Data Sources Summary

| | |
|---|---|
| Total Data Sources | 97 |
| Total Sourcing Organizations | 37 |

TABLE 1-continued

Data Sources Summary

| | |
|---|---|
| Total Sources on Active Collection | 82 |
| Total Different Source Types | 15 |

TABLE 3

Data Source Types

| | |
|---|---|
| Breach Disclosures | Spam Activity |
| Block Lists | Vulnerable Hosts |
| Configuration Parameters | Spyware |
| Compromised Hosts | Whitelists |
| Malicious Activity | Email viruses |
| Malware Servers | Multi-type |
| Reputation | Phishing |
| Suspicious Activity | User Behavior |

Of the 97 data sources identified, 82 are on "Active Collection" meaning there is a method for obtaining the data source and that its collection is automated. The high degree of automation helps to satisfy the methodology objective for adoption of techniques that are principally automated.

Table 2 lists the 6 collections methods employed for data acquisition with the "Unknown" category meaning that the sources are identified but the method and ability to collect that data source has yet be determined. The method Instances are the number of data sources that are collected using that particular method. For example, 32 of the sources are collected using the network file transfer and synchronization tool rsync (http://samba.anu.edu.au/rsync/).

TABLE 2

Data Collection Methods

| Methods | Instances | Methods | Instances |
|---|---|---|---|
| WGET | 35 | WHOIS | 1 |
| RSYNC | 32 | HTTP GET | 1 |
| API | 13 | UNKNOWN | 9 |
| MANUAL | 6 | | |

Figure 2:
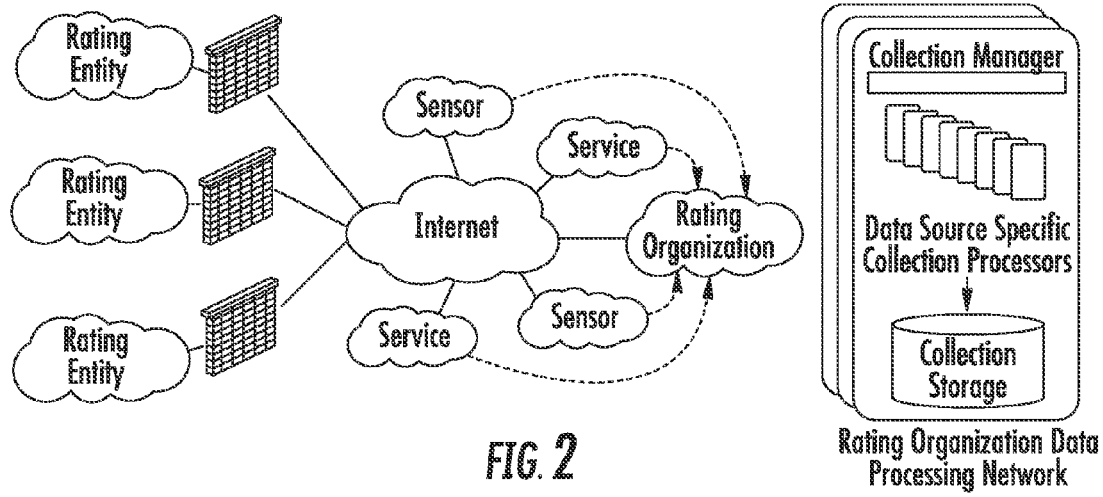
FIG. 2 is a schematic of a system for gathering security data from external sensors.

A collection processing infrastructure 50, configured to build and validate composite security ratings, is shown in FIG. 2. A plurality of different clouds represents different network segments. Rated Entity clouds 52 are organizations for which the system 10 generates a rating. Those entities include an entity perimeter or boundary, indicated by the firewall that connects to the Internet. Services clouds 54 provide data or reports on observed activity from a rated entity 52. An example of a report from a Service 54 could be a list of hosts that have been participating in malicious activity. Services use Sensor networks 56 to observe the behavior of entities. For example, a sensor could observe SPAM messages sent from a rated entity network 52 to the Internet 58.

Entity Mapping

There is no single central repository that holds information about the IP address allocation. Determining the correct and complete IP address space owned by a given entity improves the reliability and robustness of a rating.

In general, Regional Internet Registries (RIRs) manage the allocation and registration of Internet number resources (IP Addresses, Autonomous System Numbers, etc.) within a particular region of the world. There are five RIRs-ARIN for North America, AfriNIC for Africa, APNIC for Asia Pacific, RIPE for Europe, Middle East, Central Asia, and LACNIC for Latin America.

The RIRs allocate the address space to service providers, corporations, universities, etc. The RIRs provide various interfaces that enable queries of the RIR to determine who owns a given IP address. It is also possible to query the database by an entity name and get a list of IP addresses allocated to that entity. Despite lack of standardization of entity names in the RIR databases, well chosen queries can result in a very high coverage of addresses owned by an entity.

Another problem is that RIRs often allocate large chunks of addresses to Internet Service Providers (ISPs) who go on to allocate smaller address spaces to their customers. ISPs are under no obligation to report this data back to anyone. Most small companies contract with their local ISP for Internet access and don't obtain addresses from RIRs.

These problems are addressed by the entity ownership collection system 14 being configured to execute various heuristic processes including the following non-limiting list of examples:

1. Using the 'dig' (http://linux.die.net/man/1/dig) tool to determine any IP information published by an entity. The dig tool takes the domain name of the entity as an argument. For example, execution of 'dig a.com ANY' returns all IP information published by the entity a.com.
2. Use the IP addresses and domain names published to find ranges of IP addresses actually used. ISPs almost always allocate addresses in size of powers of 2 (2, 4, 8 etc.). Knowing one IP address allows probing around that space. The 'whois' (http://linux.die.net/man/1/whois) tool can be used to determine ownership of neighborhood addresses.
3. Even if the entity does not publish any IP information that can be retrieved through dig, most entities have servers whose names may be guessed. Mail servers for the domain a.com often have the name mail.a.com, SMTP servers tend to be smtp.a.com, FTP servers tend to be ftp.a.com etc. Using a tool like nslookup, the entity ownership collection system 14 can verify if any of these common names are in use by the entity.
4. If an IP address is found, the system 14 is configured to probe around the address (such as in step 2) to determine any addresses in the neighborhood owned by that entity.
5. Searching around the website of the company often gives a hint of other servers hosted by the company (ex: reports.a.com) which can be used as a starting point for search.

Rating Methodology

Organizational security risk may be measured along two vectors: vulnerability and resilience. An entity's vulnerability is defined as its "physical, technical, organizational, and cultural states," which can be exploited to create a security breach. An entity's resilience is defined to be its ability to recover from a security breach.

The system 10 uses the concepts of vulnerability and resilience by examining externally observable proxies for them. An example proxy for entity vulnerability is the number of entity-owned IP addresses, which are reported to be malicious. The higher the number of reports the more likely the entity was vulnerable and had been compromised. Resilience is inversely proportional to the duration of detected malicious activity. The shorter the duration of the malicious activity, the higher level of resilience the entity demonstrates as it can quickly identify and remove malicious infections.

To compute the ratings for an entity, the system 10 aggregates all of the data collected pertaining to the IT assets owned by that organization, such as the IP addresses controlled by the entity and the associated activity of those IP addresses. The types of activities depend on the types of data. The data sources may include false positives and the system 10 is configured to account for those uncertainties.

To determine quality metrics for IP address based assets, every IP address is uniquely mapped to an entity. Processing the data from a data source yields a list of IPs for each organization that has demonstrated suspicious or malicious behavior. The processing steps are as follows:

1. For each IP address, determine a security quality metric called "badness".
2. Badness is a number between 0 and 1 that corresponds to the extent and duration of malicious activity that was reported.
3. For each data source in which the IP address is reported, determine a data source specific badness score for that IP.
4. Consolidate the badness score for a given IP across all data sources by cross validating data to determine the aggregate Badness for that IP.
5. Aggregate the badness scores of IPs from an entity to determine the entity's IP asset based security quality metric.

The ratings processing system 30 is configured to account for differences in data sources and types. Given each data source's potentially unique view of an entity, there is not a universal technique that treated them all the same way. Data source specific modeling techniques, for example, were developed for 11 of the 97 data sources in experimental trials in order to demonstrate feasibility and validate the approach. The data sources incorporated accounted for five different data source types: Block Lists, Suspicious Activity, Malicious Servers, Compromised Hosts, and Spamming.

The following two sections give detailed examples of modeling techniques developed for calculating IP address badness for two different data sources that are representative of the data collected.

One of the data sources is a daily updated list of IP addresses that were reported by volunteer hosts from across the Internet. IP Addresses are reported in this data source if they have communicated with hosts that do not expect any inbound communication from them. It lists many more IP addresses on a given day compared with the other data sources and therefore, provides a significant amount of information contained only in this data source. However, this data source has a high incidence of false positives, where a false positive is an unwarranted report due to an incorrectly configured reporting host (i.e., the target) or a listing of an incorrect IP address due to backscatter.

False positives are accounted for by identifying events—where an event is defined as persistent, reported activity on a single IP address within a time period. For each event, heuristics are applied to determine the average intensity for the event. The intensity of an IP address on a given day is a measure of the confidence that malicious activity originated from the IP address on that day.

For the case where an event spans multiple days, the IP address is generally reported on each day in the event. However, if an IP address is listed on one day but not the next, this omission does not necessarily signify that the host has stopped its malicious behavior; rather, it could be that the host was offline for the day. For example, many corporate hosts are offline for weekends and holidays. Thus, an event is allowed to have short inactive periods, or days without any reports on the IP address. To generate the IP address quality metric, a maximum inactive period of three days is used.

The intensity of an IP address for a given day is calculated dynamically and increases both with the number of reporting targets as well as the duration of the event. Reports with a larger number of targets have larger intensities. This is because false positives due to mis-configured hosts are less likely to have occurred when multiple targets report the same IP address on the same day. Likewise, reports that belong to a persistent event have larger intensities, since persistent reports also signal the legitimacy of the malicious activity on the IP address.

The intensity, I(s) is calculated as follows:

$$I(s) = \begin{cases} 0.1, & \text{if } s < 2 \\ 0.01 e^{\frac{\ln(10)(s-1)}{4}}, & \text{if } 2 \le s < 5 \\ 0.8 - 0.7 e^{-\frac{\ln(10)(s-5)}{4}}, & \text{if } s \le 5 \end{cases}$$

where s is the number of hosts reporting the IP address. Thus, the average intensity, $I_{avg}$, of an event is the average of the intensities calculated per active day (a day with reports) and is determined as follows:

$$I_{avg} = \frac{I(s)}{T} + \frac{A \cdot I_{prev}}{T},$$

where T is the list time, A is T minus the number of days since the last update, and $I_{prev}$ is the average intensity at the last update. The Badness, $B_{IP}$, of an IP address is derived from the intensity and duration of the events for the IP, such that recent events are weighted heavier than historical events and is calculated as follows:

$$B_{IP} = \min\left(1, \frac{I_{avg}(1 - e^{-0.02})}{1 - e^{-0.12}} \sum_{t_1}^{t_n} e^{-0.02}\right),$$

where $t_1$ and $t_n$ denote time lapsed from the end and beginning of an event, respectively; and the average intensity is readjusted if the persistence surpasses a threshold.

The second data source example is a host block list that lists IP addresses that have been compromised. Based on an analysis of the data sources collection methods, the block list is considered very reliable in the sense that a listing implies that malicious activity originated from the listed address. This block list removes IP addresses from the list if no malicious activity is detected for a small window of time. Because of the high confidence in the data source's accuracy, any IP address on the block list is assigned a raw Badness of 0.8.

Once an IP address is delisted and is no longer on the block list, its Badness decays exponentially with respect to the time since it was last listed. Thus, the Badness is:

$$B_{IP} = 0.8 e^{-\frac{\ln(2)T}{182.625}},$$

where T is the time in days since the last listing. This decay rate corresponds to a half-life of six months.

Various other data sources are handled similarly but the raw score is based on the confidence in the data source's collection methods. Other data sources track CIDR blocks as opposed to individual IP addresses, and so the Badness assigned to a listing on these lists are weighted by the CIDR block size as follows:

$$B_{IP} = 0.8 W e^{-\frac{\ln(2)T}{182.625}},$$

where W is the natural log of the block size.

The total IP space badness of an entity is an aggregation of the badness of the entity's individual IP addresses and/or CIDR blocks. In the simplest model where all data sources are IP address based, the entity badness is the total badness of the IP addresses owned by the entity. To normalize ratings across entities of different sizes, the entity's network size defined as the number of active IP addresses owned by the entity is used:

$$B_{entity} = \frac{\sum_{IP \in entity} B_{IP}}{\ln(N)},$$

where N denotes the network size. Normalizing avoids penalizing of smaller entities allowing fair comparisons between entities of differing sizes.

Enhancements to the Ratings Methodology

The system 10 may also include expanded the methodology to support additional and different types of data sources. It could identify data sources that indicate different levels of IT sophistication—such information is a measure of the level of IT practice maturity.

Entity normalization methods can also account for differences in entity size beyond network size. For example, the use of other normalization methods such as number of employees may help produce more robust normalizations under certain circumstances.

Also, statistical properties of the model's internal parameters may be analyzed and adjust based on the findings. For example, certain inputs or features may be disproportionately skewing the ratings and such inputs or features may be modulated through weighting factors.

The composite security rating described above measured, amongst other things, how much, to what extent, and how recently malicious activity was detected on an entity's cumulative IP space. The score could also be adapted to show a level of confidence. For example, a failure to detect malicious activity on an entity's IP space does not necessarily imply non-malicious behavior. Rather, the data sources may lack coverage on the entity's IP space. By outputting a range as opposed to a number, the system 10 is able to convey its confidence in a rating where a larger range necessarily implies a lower confidence, and a smaller range necessarily implies a higher confidence.

Such a range could be computed from a mean score and a confidence range, which could be determined from a developed discrete choice model. Features such as the Badness scores from each data source could help determine the mean score. Features such as redundancy between data sources and network size could also help determine the confidence range.

Entity mapping may also be improved through other data sources and functions. Data sharing relationships with Internet Service Providers might provide additional data on security outcomes and practices at entity computer systems. Also, consumers of the scoring reports may already have partner-mapping data through the nature of their relationship with the entity or may be able to request the information.

Entity mapping may also be facilitated by persistent updates of the heuristics, such as updating prefixes from BGP announcements and data from Regional Internet Registries.

Data storage used by the system 10 may be improved to minimize the disk space required while supporting rapid inclusion of new entity ratings. For example, high-speed data access layers may be created for daily ratings computation.

Speed and scale can be accomplished through distributed or parallel processing on different systems. A distributed data source query interface may be implemented so that massive and expensive centralized data storage is not required.

The system 10 may also be configured to develop and evaluate predictive capabilities of information security ratings and incorporate them into the rating methodology.

The ability to demonstrate predictability has a dependency on data reliability. For example, improving coverage of malicious events improves data reliability. Statistical evaluations may be used to disambiguate strong entity performance (e.g., no malicious activity) from low coverage (e.g., lack of information on the malicious activity). These evaluations can then be used in the rating methodology.

Statistical evaluations of data coverage may include a data accuracy assessment wherein levels of coverage assurance associated with a particular adopted data source are determined. Also, observations across data sources may be compared to determine data sources of high probability or low probability of coverage for a given entity.

Predictive modeling may include determination of entity historical trends to display and predict future performance. Regression and machine learning based models may be developed to predict information security performance. Models may be evaluated and further developed for predictive capability through a series of prediction experiments.

Also, the data source features may be analyzed for correlations of high and low performance. For example, entities with behavior "X" tend to perform well and entities that demonstrate property "Y" tend to behave poorly.

Use of External and Internal Security Data

Figure 3:
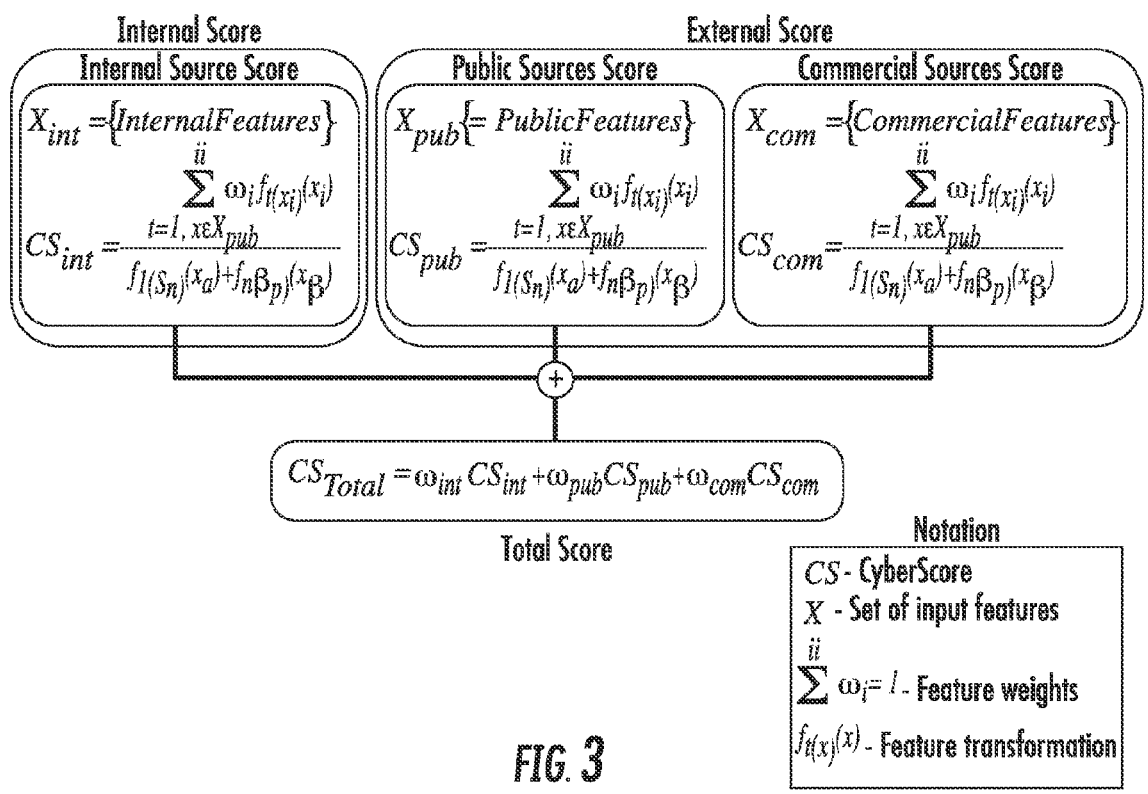
FIG. 3 is a schematic of a composite security rating calculation.

The system 10 may also include internally derived security assessments. For example, such a score computation is shown in FIG. 3. The final score $S_{Total}$ has two components, the Internal score and the External score.

The Internal score, $S_{int}$, is derived from data collected and observed from inside the enterprise. Data sources that provide inputs to the internal scoring function could include, but are not limited to, the following:
  Vulnerability scans
  Firewall Rules
  Incident Reports
  Configurations
  Software inventory
  Policies
  Controls
  User Behavior The features from each of the data sources are extracted to create a feature vector. This feature vector is $X_{int}=\{InternalFeatures\}$ in the "Internal Source Score," as shown in FIG. 3. Features include, but are not limited to, derived metrics from the data sources (e.g., the number of remotely exploitable vulnerabilities from outside the entity, the number of incidents, or the number of vulnerable versions of software).

Each feature $x_i$ in $X_{INT}$ has a corresponding transformation function $f_{t(x_i)}(x_i)$ that performs a normalization transformation such that the resultants can be summed.

Each feature $x_i$ in $X_{INT}$ also has corresponding weight $\omega_i$ such that different weights can be placed on the resultant feature transformation where the sum of the weights equal is unity $$\sum_{i=1}^{n} \omega_i = 1.$$

The sum of the transformed and weighted feature vector is computed by summing each resultant for each of the features $$\sum_{i=1, x \in X_{int}}^{n} \omega_i f_{t(x_i)}(x_i).$$

The final score $S_{int}$ is the summation normalized by a set of normalization factors given as $f_{t(x_\alpha)}(x_\alpha)+f_{t(x_\beta)}(x_\beta)$ where each normalization factor $x_\alpha$, $x_\beta$, . . . also has a factor normalization transformation function.

The computation of the Internal Score is given as:

$$S_{int} = \frac{\sum_{i=1, x \in X_{int}}^{n} \omega_i f_{t(x_i)}(x_i)}{f_{t(x_\alpha)}(x_\alpha) + f_{t(x_\beta)}(x_\beta)}$$

The External Score is the combination of the Public Sources Score ($S_{pub}$) and the Commercial Sources ($S_{com}$). $S_{pub}$ and $S_{com}$ are derived using the same heuristic combinatorial functions as the Internal Score. However, the input data sources, weights, transformation functions and normalization factors are different.

$S_{pub}$ and $S_{com}$ have their own feature vectors $X_{pub}=\{PublicFeatures\}$ and $X_{com}=\{CommercialFeatures\}$ based on the data input sources used.

Data sources in $X_{pub}$ that provide inputs to the $S_{pub}$ score could include but are not limited to the following:
  Industry reports
  Internet monitoring web sites that publish reports (ex: www.malwareurl.com)
  News articles
  Court records Data sources in $X_{com}$ that provide inputs to the $S_{com}$ score could include but are not limited to the following:
  Company proprietary data collected during operations
  Renesys
  Arbor Networks
  Business intelligence bought from corporations and services
  User Behavior With the Internal and External Scores computed, the final total score is computed and the weighted sum of the three:
$S_{Total}=\omega_{int}S_{int}+\omega_{pub}S_{pub}+\omega_{com}S_{com}$ It is possible that the algorithm does not have the same inputs for all entities. More information may be available for some entities compared to other entities. Given this, each data source is assigned a normalized confidence level based on how much they contribute to the computation of the enterprise score. Depending on the actual data that went into rating the company, the confidence level is assigned as a sum of the confidence levels associated with the data sources. The confidence level can be used to assign a range of scores for an enterprise. For instance, if an enterprise is rated as 750 with a confidence level of 0.8, the entity's actual score is reported as (750−(1−0.8)*100, 750)=(730-750). An entity's score is deemed to be unavailable if the confidence level is below a minimum threshold of 0.5.

It should be noted that the $S_{int}$ may be zero due to a lack of available information or permission, wherein $S_{total}$ becomes characteristic only of externally observable characteristics. Also, characteristics for the calculation can be used in conjunction, or vice versa, with functions and aspects of the remaining systems described hereinabove and below.

Distributed System

Figure 4:
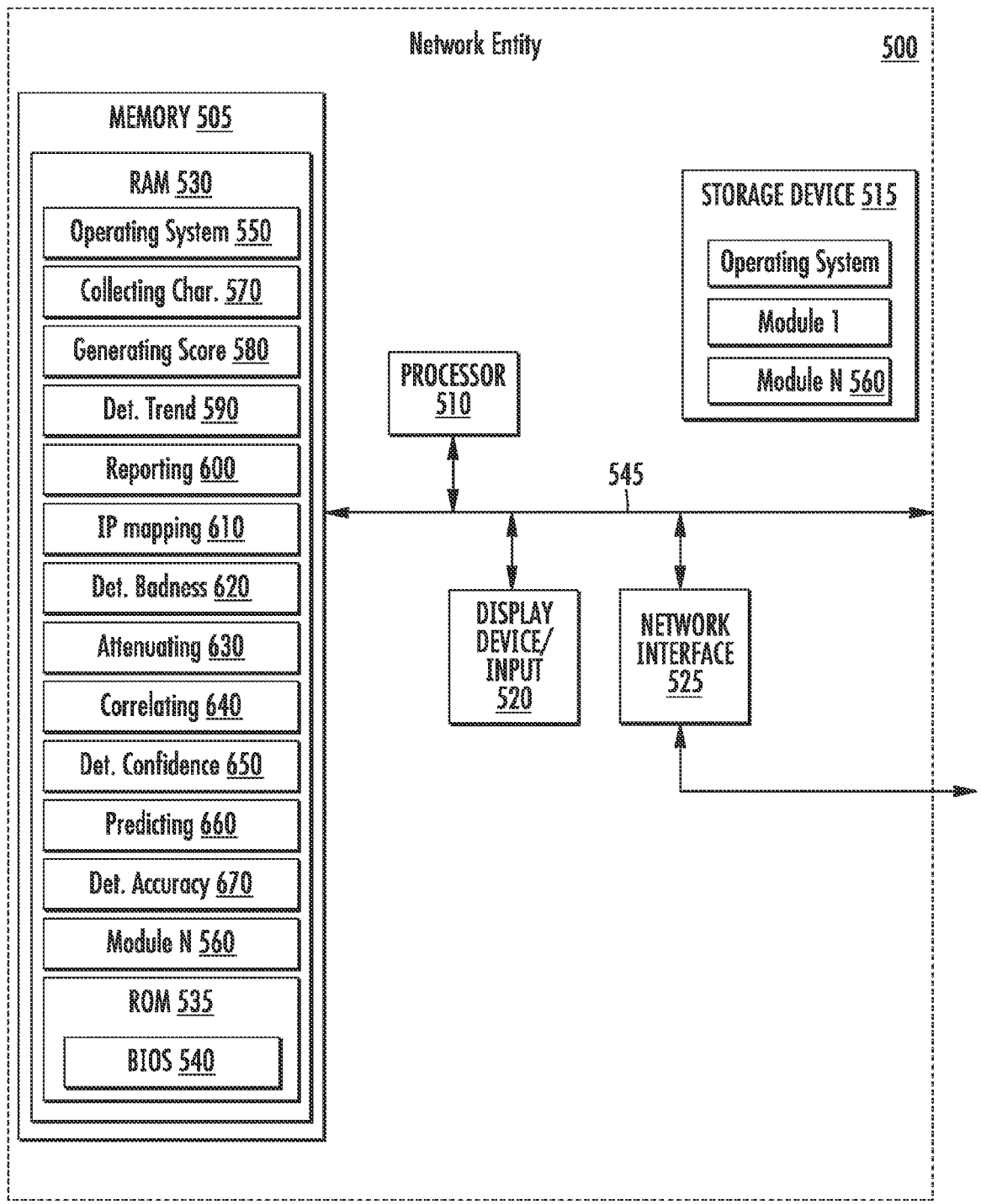
FIG. 4 is a schematic of a distributed system for evaluating information security.

Referring now to FIG. 4, a schematic diagram of a central server 500, or similar network entity, configured to implement a system for creating a composite security score is provided. As used herein, the designation "central" merely serves to describe the common functionality the server provides for multiple clients or other computing devices and does not require or infer any centralized positioning of the server relative to other computing devices. As may be understood from FIG. 4, the central server 500 may include a processor 510 that communicates with other elements within the central server 500 via a system interface or bus 545. Also included in the central server 500 may be a display device/input device 520 for receiving and displaying data. This display device/input device 520 may be, for example, a keyboard or pointing device that is used in combination with a monitor. The central server 500 may further include memory 505, which may include both read only memory (ROM) 535 and random access memory (RAM) 530. The server's ROM 535 may be used to store a basic input/output system 540 (BIOS), containing the basic routines that help to transfer information across the one or more networks.

In addition, the central server 500 may include at least one storage device 515, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 515 may be connected to the system bus 545 by an appropriate interface. The storage devices 515 and their associated computer-readable media may provide nonvolatile storage for a central server. It is important to note that the computer-readable media described above could be replaced by any other type of computer-readable media known in the art. Such media include, for example, magnetic cassettes, flash memory cards and digital video disks.

A number of program modules may be stored by the various storage devices and within RAM 530. Such program modules may include an operating system 550 and a plurality of one or more (N) modules 560. The modules 560 may control certain aspects of the operation of the central server 500, with the assistance of the processor 510 and the operating system 550. For example, the modules may perform the functions described above and illustrated by the figures and other materials disclosed herein, such as collecting security characterizations 570, generating a composite rating 580, determining a trend 590, reporting the ratings 600, IP mapping 610, determining a badness quality metric 620, attenuating a raw score 630, correlating with statistical outcomes 640, determining a confidence range 650, predicting future performance 660 and determining an accuracy 670.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer implemented method comprising:
on one or more computers, maintaining in a database an entity map that maps technical assets to respective companies or other entities with which the assets are associated, wherein mapping technical assets to respective companies or other entities comprises determining IP information by annotating a domain name with naming conventions for at least one of a mail server, an SMTP server, and an FTP server, thereby deriving a likely server name having assigned IP addresses,
automatically useing sensors on the Internet to collect externally observable cyber-security characterizations of the technical assets that have been mapped to each of the entities and associating the observable cyber-security characterizations with a respective entity based at least in part on the derived server name,
automatically deriving observations about the technical assets from the collected cyber-security characterizations, wherein the derived observations comprise (i) a number of technical assets that have been reported to be malicious and (ii) a duration of detected malicious activity associated with the technical assets,
automatically generating a cyber-security rating for each of the entities using the entity map and the derived observations, and through a communication network, exposing to users in a user interface of a portal, information about the cyber-security ratings of the entities that is useful to decisions about entities with which to do business.

2. The method of claim 1 in which the technical assets comprise an IP space.

3. The method of claim 1 in which maintaining an entity map comprises querying a regional Internet registry.

4. The method of claim 3 in which maintaining an entity map comprises submitting a name of one of the entities to the regional Internet registry.

5. The method of claim 4 in which submitting the entity name includes submitting spelling variations of the entity name.

6. The method of claim 1 in which maintaining an entity map comprises using a domain name associated with the entity.

7. The method of claim 6 in which maintaining an entity map comprises using a dig tool on the domain name to determine a published IP address.

8. The method of claim 1 in which maintaining an entity map comprises probing IP addresses around a published IP address.

9. The method of claim 8 in which the probing comprises probing addresses in powers of 2 around the published IP address.

10. The method of claim 1 in which maintaining an entity map comprises using a name server lookup to verify the derived server name.

11. The method of claim 2 comprising using the IP space for collecting the cyber-security characterizations.

12. The method of claim 1 in which the technical assets that are associated with cyber-security characterizations of the respective entities comprise technical assets that the entity owns, controls, uses, or is affiliated with.

13. The method of claim 1 in which the technical assets comprise ranges of IP addresses.

14. The method of claim 1 in which the technical assets comprise servers.

15. The method of claim 1 in which maintaining an entity map comprises using information received from Internet Service Providers.

16. The method of claim 1 in which maintaining an entity map comprises using heuristics.

17. The method of claim 16 comprising persistently updating the heuristics.

18. The method of claim 1, wherein annotating comprises prepending to the domain name at least one of "mail," "smtp," and "ftp".

19. A computer implemented method comprising:
on one or more computers operating with a database, maintaining an entity map that maps technical assets that comprise an IP space to respective entities with which the assets are associated,
the maintaining of the entity map comprising (a) automatically using sensors on the Internet to collect externally observable cyber-security characterizations of the technical assets that have been mapped to each of the entities, (b) associating the observable cyber-security characterizations with a respective entity based at least in part on the derived server name, (c) submitting names of the entities to regional Internet registries using various spellings of the names, (d) using domain names associated with the entities, (e) probing IP addresses around published IP addresses, (f) using a name server lookup to verify IP addresses associated with domain names, (g) using information received from Internet Service Providers, (h) annotating a domain name with naming conventions for at least one of a mail server, an SMTP server, and an FTP server, thereby deriving a likely server name having assigned IP addresses, and (i) applying heuristics,
automatically deriving observations about the technical assets from the collected cyber-security characterizations, wherein the derived observations comprise (a) a number of technical assets that have been reported to be malicious and (b) a duration of detected malicious activity associated with the technical assets,
automatically generating a cyber-security rating for each of the entities using the entity map and the derived observations, and
through a communication network, exposing to users in a user interface the cyber-security ratings of the entities.

20. A system comprising:
one or more computers programmed to facilitate operations comprising:
maintaining in a database an entity map that maps technical assets to respective companies or other entities with which the assets are associated, wherein mapping technical assets to respective companies or other entities comprises determining IP information by annotating a domain name with naming conventions for at least one of a mail server, an SMTP server, and an FTP server, thereby deriving a likely server name having assigned IP addresses,
collecting, using sensors on the Internet, externally observable cyber-security characterizations of the technical assets that have been mapped to each of the entities and associating the observable cyber-security characterizations with a respective entity based at least in part on the derived server name,
deriving observations about the technical assets from the collected cyber-security characterizations, wherein the derived observations comprise (i) a number of technical assets that have been reported to be malicious and (ii) a duration of detected malicious activity associated with the technical assets,
generating a cyber-security rating for each of the entities using the entity map and the derived observations, and
through a communication network, exposing to users in a user interface of a portal, information about the cyber-security ratings of the entities that is useful to decisions about entities with which to do business.

* * * * *